(12) United States Patent
Ren et al.

(10) Patent No.: US 12,361,037 B2
(45) Date of Patent: Jul. 15, 2025

(54) METHOD FOR PROCESSING QUESTION, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Weijie Ren, Beijing (CN); Zhenyu Jiao, Beijing (CN); Shuqi Sun, Beijing (CN); Yue Chang, Beijing (CN); Tingting Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 394 days.

(21) Appl. No.: 18/055,947

(22) Filed: Nov. 16, 2022

(65) Prior Publication Data

US 2023/0070966 A1 Mar. 9, 2023

(30) Foreign Application Priority Data

Dec. 23, 2021 (CN) .......................... 202111590578.3

(51) Int. Cl.
*G06F 16/3329* (2025.01)
*G06F 16/334* (2025.01)

(52) U.S. Cl.
CPC ...... *G06F 16/3329* (2019.01); *G06F 16/3347* (2019.01)

(58) Field of Classification Search
CPC ............. G06F 16/3329; G06F 16/3347; G06F 16/332; G06F 16/335; G06F 16/338;
(Continued)

(56) References Cited

U.S. PATENT DOCUMENTS

| 2014/0164303 A1 | 6/2014 | Bagchi et al. |
| 2020/0250248 A1 | 8/2020 | Yu et al. |
| 2021/0150155 A1* | 5/2021 | Kim ........................ H04L 51/02 |

FOREIGN PATENT DOCUMENTS

| CN | 106844530 A | 6/2017 |
| CN | 108304437 A | 7/2018 |

(Continued)

OTHER PUBLICATIONS

Notice of Allowance for corresponding Chinese patent application No. 202111590578.3 mailed on Oct. 18, 2022 (11 pages).

(Continued)

*Primary Examiner* — Linda Wong
(74) *Attorney, Agent, or Firm* — OSHA BERGMAN WATANABE & BURTON LLP

(57) ABSTRACT

A method for processing a question is performed by an electronic device. The method includes: receiving a question to be processed from a user input; determining a first similarity between the question to be processed and each candidate question in at least one reference question-answer (Q&A) pair; determining a second similarity between the question to be processed and the at least one reference Q&A pair based on the first similarity; determining a target Q&A pair from the at least one reference Q&A pair based on the second similarity; and replying to the user for the question to be processed based on a target answer in the target Q&A pair.

17 Claims, 8 Drawing Sheets

(58) Field of Classification Search
CPC ... G06F 16/90344; G06F 18/22; G06N 3/044;
G06N 3/045; G06N 3/048; G06N 3/08
See application file for complete search history.

(56) References Cited

FOREIGN PATENT DOCUMENTS

| | | | |
|---|---|---|---|
| CN | 108549710 A | * | 9/2018 |
| CN | 109271505 A | | 1/2019 |
| CN | 110019715 A | | 7/2019 |
| CN | 110096580 A | | 8/2019 |
| CN | 110309283 A | | 10/2019 |
| CN | 111046155 A | | 4/2020 |
| CN | 111159363 A | | 5/2020 |
| CN | 111460081 A | | 7/2020 |
| CN | 111858859 A | | 10/2020 |
| CN | 112948557 A | | 6/2021 |
| CN | 113342924 A | | 9/2021 |
| CN | 113342958 A | | 9/2021 |
| KR | 20190076712 A | | 7/2019 |

OTHER PUBLICATIONS

Office Action issued for corresponding Chinese patent application No. 202111590578.3, mailed on Aug. 4, 2022 (13 pages).
"Research on Intelligent Question Answering System Based on Deep Learning," (74 pages).
"Research on Course Answering System Based on Artificial Intelligence," Dalian Maritime University (67 pages).
Cai Hui, "Design and Implementation of Question Answering Application by Answer Retrieval," Institute of Network Technology; Feb. 12, 2019 (81 pages).

* cited by examiner

METHOD FOR PROCESSING QUESTION, ELECTRONIC DEVICE AND STORAGE MEDIUM

CROSS REFERENCE TO RELATED APPLICATIONS

This application claims priority to Chinese Patent Application No. 202111590578.3, filed on Dec. 23, 2021, the entire content of which is incorporated herein by reference.

TECHNICAL FIELD

The disclosure relates to the technical field of Artificial Intelligence (AI), especially the technical fields of natural language processing and deep learning, in particular to a method for processing a question, an apparatus for processing a question, an electronic device and a storage medium.

BACKGROUND

With the rapid development of Internet services, demands for intelligent question and answer are increasing. The intelligent question and answer belongs to the field of AI, which provides personalized information services to a user, by precisely locating a question in the form of one question and one answer, and interacting with the user.

Therefore, it is very important to process the user input question and obtain an answer corresponding to the question.

SUMMARY

According to a first aspect of the disclosure, a method for processing a question is performed by an electronic device. The method includes: receiving a question to be processed from a user input; determining a first similarity between the question to be processed and each candidate question in at least one reference question-answer (Q&A) pair; determining a second similarity between the question to be processed and the at least one reference Q&A pair based on the first similarity; determining a target Q&A pair from the at least one reference Q&A pair based on the second similarity; and replying to the user for the question to be processed based on a target answer in the target question-answer pair.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is caused to implement the method of the first aspect as described above.

According to a third aspect of the disclosure, a non-transitory computer-readable storage medium having computer instructions stored thereon is provided. The computer instructions are configured to cause a computer to implement the method of the first aspect as described above.

It should be understood that the content described in this section is not intended to identify key or important features of the embodiments of the disclosure, nor is it intended to limit the scope of the disclosure. Additional features of the disclosure may be easily understood based on the following description.

BRIEF DESCRIPTION OF THE DRAWINGS

The drawings are used to better understand the solution and do not constitute a limitation to the disclosure.

DETAILED DESCRIPTION

Figure 1:
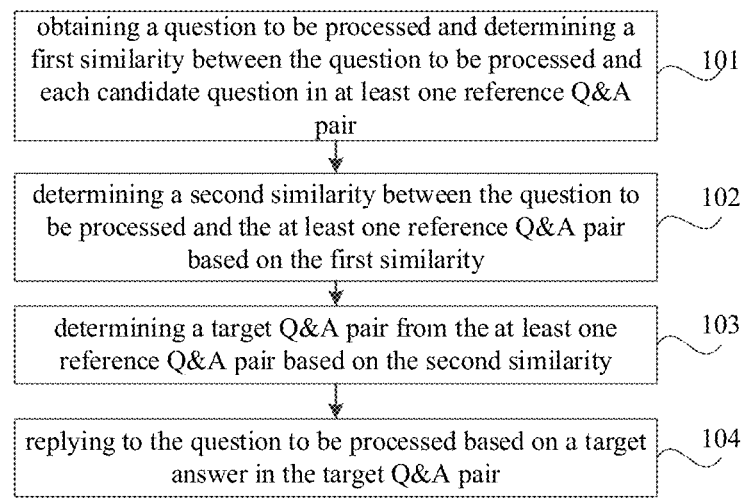
FIG. 1 is a flowchart of a method for processing a question according to the first embodiment of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The Frequently Asked Questions (FAQ) matching algorithm is an important implementation in dialogue systems or intelligent Q&A systems. Usually, a FAQ system includes a plurality of labeled Q&A pairs, and each Q&A pair includes multiple candidate questions. When a user enters/inputs a question into the FAQ system, the FAQ system may retrieve multiple candidate questions similar to the user input question from the above multiple Q&A pairs based on a retrieval algorithm, and determine the candidate question closest to the user input question from the above candidate questions based on a matching algorithm. In this way, the answer in the Q&A pair to which the candidate question closest to the user input question belongs is determined as the answer that matches the user input question.

For example, the FAQ system includes two Q&A pairs. The first pair is about name and contains candidate questions such as, "what is your name" and "may I ask your name", and the answer is "I am Little D". The second pair is about age, and contains candidate questions, such as "how old are you" and "what's your age", and the answer is "I am XX years old". When the user input question is "your name", two candidate questions "what is your name" and "may I ask your name" are retrieved from the above two Q&A pairs based on the retrieval algorithm. The candidate question "what is your name" is determined as a better match to the user question "your name" based on the matching algorithm, and then it is determined that the user input question belongs to the first Q&A pair.

Since the matching algorithm ultimately determines the category to which the user input question belongs, the matching algorithm is the key in the whole FAQ system.

In the related art, a FAQ matching model in the existing FAQ systems is usually implemented based on Pointwise.

Pointwise means that each similarity score between a question and each candidate question in a candidate set is calculated separately. The FAQ system implemented based on the Pointwise matching algorithm considers only the closest candidate question when matching the question to each of the candidate questions, without considering the relation among the candidate questions in the candidate set.

For mainstream Pointwise matching algorithms, there are schemes based on matching algorithms, such as sentence vector cosine, siamese and Interaction-base algorithms. In details, two questions are input into a model and a similarity score between these two questions is predicted by some network structures in the model. As described above, the questions "your name?" and "what is your name?" are input into the model together, and the model may predict the similarity score between "your name" and "what is your name".

After determining the similarity score between the question and the candidate question, it is necessary to determine the Q&A pair to which the question belongs. The existing FAQ systems usually use the maximum similarity score of a candidate question in a Q&A pair to represent the score of the Q&A pair. Thus, the Q&A pair to which the question belongs can be determined based on the score of the Q&A pair. For example, the Q&A pair having the greatest score can be used as the Q&A pair to which the question belongs.

However, for the FAQ system based on the Pointwise matching algorithm, the inputs at the training phase are inconsistent those at the prediction phase, which leads to an increase in the error between training and prediction. In the matching phase of the FAQ system, the FAQ system needs to find the most similar candidate question from the candidate questions, which means that the inputs of the FAQ system are actually the whole candidate set. The FAQ system based on Pointwise matching algorithm needs to input each candidate question into the model one by one. Thus, such FAQ system does not take into account the relation among the candidate questions, and the training data generated through model training cannot be fully consistent with the inputs at the prediction phase.

Taking the above example as an example, suppose that the user input question is "your name", either "your name" and "what is your name", or "your name" and "may I ask your name" is input into the model respectively. However, in the reasonable way, all the "your name", "what is your name" and "may I ask your name" are input into the model together.

In addition, the question based matching may lead to inconsistency between the output of the model prediction phase and the output of the FAQ system. The FAQ system ultimately needs the category to which the question belongs, rather than the candidate question that is most similar to the question. The existing solutions only consider the matching degree between the user input question and candidate questions, and ignore the matching degree between the user input question and the Q&A pair. This may lead to abnormal recognition where the user input question only matches an abnormal candidate question, but does not match any other candidate questions in the Q&A pair.

Based on the example above, the model may output two scores for "what is your name" and "may I ask your name", but a reasonable output would be the score for the first Q&A pair and the score for the second Q&A pair.

In response to the above problems, the disclosure provides a method for processing a question, an apparatus for processing a question, an electronic device and a storage medium.

The method for processing a question, the apparatus for processing a question, the electronic device and the storage medium of embodiments of the disclosure are described below with reference to the accompanying drawings.

FIG. 1 is a flowchart of a method for processing a question according to the first embodiment of the disclosure.

According to the embodiments of the disclosure, the method for processing a question is applied to the apparatus for processing a question, and the apparatus can be applied to any electronic device, for performing problem processing functions.

The electronic device may be any device with computing capability, such as a Personal Computer (PC), a mobile terminal, and a server. The mobile terminal may be, for example, an in-vehicle device, a cell phone, a tablet computer, a personal digital assistant, a wearable device, and other hardware devices having various operating systems, touch screens, and/or displays.

As illustrated in FIG. 1, the method for processing a question may include the following steps at 101-104.

At 101, a question to be processed is obtained and a first similarity between the question to be processed and each candidate question in at least one reference Q&A pair is determined.

In the embodiments of the disclosure, the question to be processed may be the user input question, and the input forms include, but are not limited to, a touch input (e.g., swiping and clicking), a keyboard input, and a voice input In this disclosure, the number of reference Q&A pairs may be one or more, which is not limited in this disclosure. The reference Q&A pairs are predefined, and each reference Q&A pair may include at least one candidate question as well as one answer.

For example, when the first reference Q&A pair is about name, the reference Q&A pair may include candidate questions such as "what is your name" and "may I ask your name" and "your name is", and the answer in the first reference Q&A pair can be "My name is Little D". For example, when the second reference Q&A pair is about age, it may include candidate questions such as "How old are you", and "what's your age", and the answer in the reference Q&A pair can be "I am XX years old".

In the embodiments of the disclosure, the question to be processed is obtained and the similarity between the question to be processed and each candidate question in at least one reference Q&A pair is determined, which is noted as the first similarity in the disclosure. For example, the first similarity between the question to be processed and each candidate question can be determined based on a similarity calculation algorithm.

At 102, a second similarity between the question to be processed and the at least one reference Q&A pair is determined based on the first similarity between the question to be processed and each candidate question in the at least one reference Q&A pair.

In the embodiments of the disclosure, for any reference Q&A pair, the similarity between the question to be processed and the reference Q&A pair can be determined based on the first similarity between the question to be processed and each candidate question in the reference Q&A pair, which is noted as the second similarity in the disclosure.

At 103, a target Q&A pair is determined from the at least one reference Q&A pair based on the second similarity of the at least one reference Q&A pair.

In the embodiment of the disclosure, the target Q&A pair may be determined from the reference Q&A pair based on the second similarity.

In a possible implementation, the reference Q&A pair having the maximum second similarity can be used as the target Q&A pair.

In another possible implementation, the reference Q&A pair having the second similarity greater than a preset similarity threshold value (e.g., 80%, 90% and 95%) can be used as the target Q&A pair.

Therefore, it is possible to determine the target Q&A pair according to different methods, thereby enhancing the flexibility and applicability of the method.

At 104, the question to be processed is replied based on a target answer in the target Q&A pair.

In this embodiment of the disclosure, the question to be processed can be replied based on the target answer in the target Q&A pair.

Taking the above example as an example, assuming that the question to be processed is "your name", and it is determined that the second similarity between this question to be processed and the first reference Q&A pair is the greatest, the question to be processed is replied according to the answer in the first reference Q&A pair, that is, the reply message is "My name is Little D".

According to the method for processing a question of the disclosure, both the first similarity between the question to be processed and each candidate question in the at least one reference Q&A pair, and the second similarity between the question to be processed and the at least one reference Q&A pair are determined. Afterwards, the target Q&A pair is determined from the at least one reference Q&A pair based on the second similarity, to reply the question to be processed based on the target answer in the target Q&A pair. Therefore, the target Q&A pair to which the question to be processed belongs is determined based on the similarity between the question to be processed and each reference Q&A pair, to reply to the user for the question to be processed according to the target answer in the target Q&A pair, thus improving the accuracy and reliability of the question reply results and improving the human-machine interaction performance of the electronic device in the field of intelligent question and answer. It should be noted that collection, storage, use, processing, transmission, provision and disclosure of the user's personal information involved in the technical solutions of the disclosure are processed with the consent of the user, and they all comply with the provisions of relevant laws and regulations and are not contrary to public order and morality.

In order to clearly illustrate how to determine the second similarity between the question to be processed and the reference Q&A pair in the above embodiments of the disclosure based on the first similarity between the question to be processed and each candidate question in the reference Q&A pair, the disclosure also provides a method for processing a question.

Figure 2:
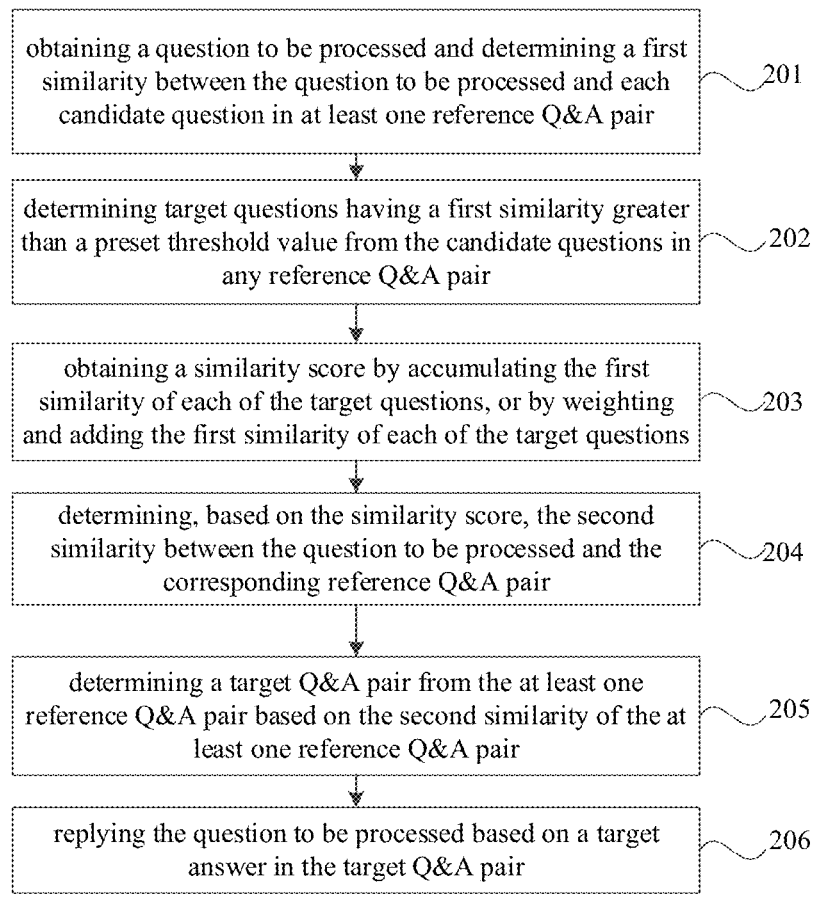
FIG. 2 is a flowchart of a method for processing a question according to the second embodiment of the disclosure.

FIG. 2 is a flowchart of a method for processing a question according to the second embodiment of the disclosure.

As illustrated in FIG. 2, the method for processing a question includes the following steps at 201-206.

At 201, a question to be processed is obtained and a first similarity between the question to be processed and each candidate question in at least one reference Q&A pair is determined.

The execution process of step 201 can be seen in the execution process of any of the embodiments of the disclosure and may not be described herein.

At 202, target questions having a first similarity greater than a preset threshold value are determined from the candidate questions in the reference Q&A pair.

In the embodiment of the disclosure, for any reference Q&A pair, the target questions having a first similarity greater than the preset threshold value are determined from each candidate question in the reference Q&A pair. That is, each candidate question in the reference Q&A pair can be screened to retain the target questions having the first similarity greater than the preset threshold value.

At 203, the first similarity of each of the target questions are accumulated, or, the first similarity of each of the target questions are weighted and added, to obtain a similarity score.

The similarity score is used to represent the similarity between the question to be processed and the reference Q&A pair.

In the embodiments of the disclosure, the first similarity of each of the target questions may be accumulated to obtain the similarity score, or, the first similarity of each of the target questions may be weighted and added to obtain the similarity score.

At 204, based on the similarity score, the second similarity between the question to be processed and the corresponding reference Q&A pair is determined.

In the embodiments of the disclosure, the second similarity between the question to be processed and the corresponding reference Q&A pair may be determined based on the similarity score. The similarity score is positively related to the second similarity.

For example, the similarity score can be used as the second similarity between the question to be processed and the corresponding reference Q&A pair.

For another example, the second similarity between the question to be processed and the corresponding reference Q&A pair can be determined according to the following equation (1):

$$y_c = sigmoid\left(\sum_{sth\ candidate question\ belongs\ to\ the\ cth\ Q\&A\ pair} \max(y_s, T)\right) \quad (1)$$

where $y_c$ is the second similarity of the $c^{th}$ reference Q&A pair, T is a preset threshold value (e.g., 0), and $y_s$ is the first similarity of the $s^{th}$ candidate question in the $c^{th}$ reference Q&A pair.

It should be noted that in the disclosure, target questions are obtained by screening the candidate questions in the reference Q&A pair and the second similarity between the question to be processed and the reference Q&A pair is determined based on the first similarity of each target question, which are taken only as an example. In practical application, there is no need to screen each candidate question. That is, for any one reference Q&A pair, the first similarity of each candidate question in the reference Q&A pair can be accumulated, or the first similarity of each candidate question in the reference Q&A pair can be weighted and added to obtain the similarity score, so as to determine the second similarity between the question to be processed and the reference Q&A pair based on the similarity score.

At 205, a target Q&A pair is determined from the at least one reference Q&A pair based on the second similarity of the at least one reference Q&A pair.

At 206, the question to be processed is replied based on a target answer in the target Q&A pair.

The execution process of the steps at 205 to 206 can be found in the execution process of any of the embodiments of the disclosure and may not be described herein.

According to the method of this disclosure, only the target question with the first similarity greater than the preset threshold value is retained by screening each candidate question according to the first similarity corresponding to each candidate question in the reference Q&A pair, so that the second similarity between the question to be processed and the corresponding reference Q&A pair can be determined according to the first similarity of each target question. As such, the negative impact of the candidate questions with the similarity equal to or less than the preset threshold value on the reference Q&A pair can be removed, thus improving the accuracy and reliability of the subsequent target Q&A pair determination results.

To clearly illustrate how the first similarity between the question to be processed and each candidate question is determined in the above embodiments of the disclosure, the disclosure also provides a method for processing a question.

Figure 3:
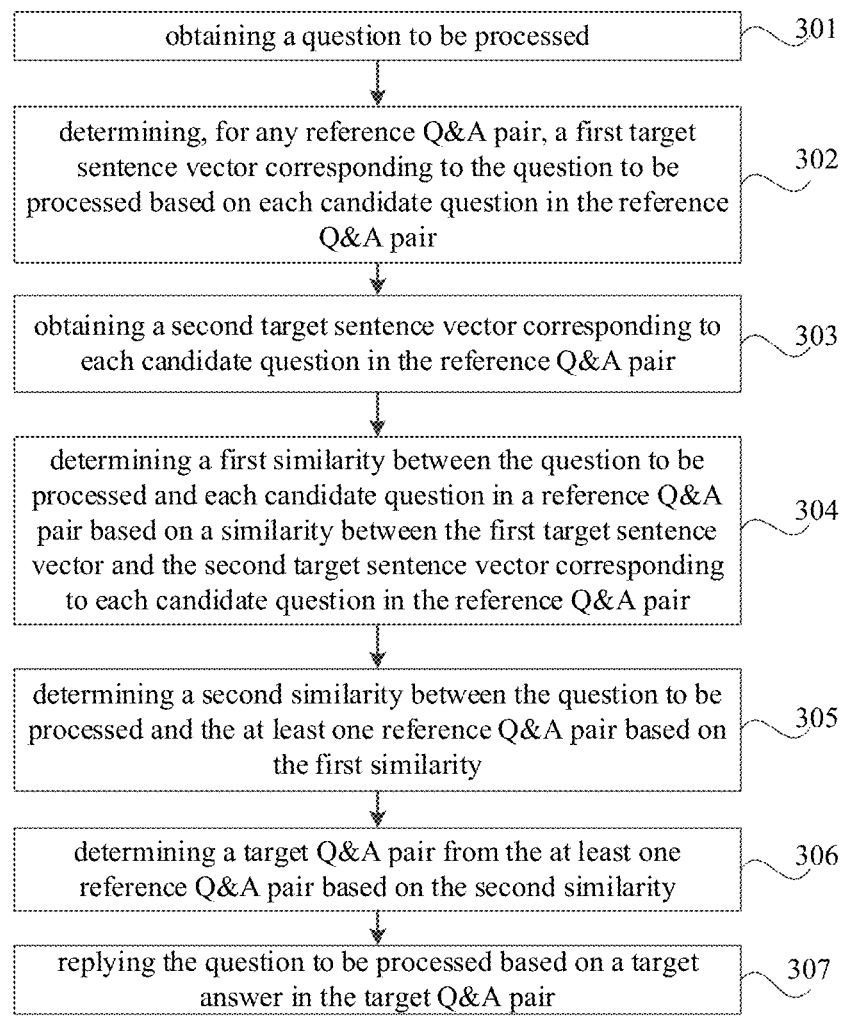
FIG. 3 is a flowchart of a method for processing a question according to the third embodiment of the disclosure.

FIG. 3 is a flowchart of a method for processing a question according to the third embodiment of the disclosure.

As illustrated in FIG. 3, the method for processing a question further includes the following steps at 301-307.

At 301, a question to be processed is obtained.

The execution process of step 301 can be found in the execution process of any of the embodiments of the disclosure and may not be described herein.

At 302, for any reference Q&A pair, a first target sentence vector corresponding to the question to be processed is determined based on each candidate question in the reference Q&A pair.

In the embodiments of the disclosure, for any reference Q&A pair, the sentence vector corresponding to the question to be processed can be determined based on each candidate question in the reference Q&A pair, which is noted as the first target sentence vector in the disclosure. That is, the first target sentence vector corresponding to the question to be processed can be different for different reference Q&A pairs.

At 303, a second target sentence vector corresponding to each candidate question in the reference Q&A pair is obtained.

In the embodiments of the disclosure, the sentence vector corresponding to each candidate question in the reference Q&A pair can be obtained and noted as the second target sentence vector in the disclosure.

At 304, the first similarity between the question to be processed and each candidate question in the reference Q&A pair is determined based on a similarity between the first target sentence vector and the second target sentence vector corresponding to each candidate question in the reference Q&A pair.

In the embodiments of the disclosure, the first similarity between the question to be processed and each candidate question in the reference Q&A pair may be determined based on the similarity between the first target sentence vector corresponding to the question to be processed and the second target sentence vector corresponding to each candidate question in the above reference Q&A pair. For example, for each candidate question in the reference Q&A pair, the similarity between the first target sentence vector corresponding to the question to be processed and the second target sentence vector corresponding to that candidate question can be used as the first similarity between the question to be processed and that candidate question.

For example, if the first target sentence vector corresponding to the question to be processed is labeled as $\gamma$, and there are m candidate questions in the reference Q&A pair, then for the $s^{th}$ candidate question in a reference Q&A pair, the second target sentence vector corresponding to that candidate question is labeled as $\delta^s$, and the first similarity between the question to be processed and the $s^{th}$ candidate question can be determined by the following equation:

$$y_s = H(\gamma, \delta^s) \qquad (2)$$

where $y_s$ is the first similarity of the $s^{th}$ candidate question in the reference Q&A pair, and the H function is a nonlinear function for mapping vectors $\gamma$ and $\delta^s$ to a real number space for similarity calculation.

At 305, a second similarity between the question to be processed and the at least one reference Q&A pair is determined based on the first similarity between the question to be processed and each candidate question in the reference Q&A pair.

At 306, a target Q&A pair is determined from the at least one reference Q&A pair based on the second similarity of the at least one reference Q&A pair.

At 307, the question to be processed is replied based on a target answer in the target Q&A pair.

The process of performing the steps at 305 to 307 can be found in the process of performing any of the embodiments of the disclosure and may not be repeated herein.

According to the method for processing a question of the disclosure, for any reference Q&A pair, the first target sentence vector corresponding to the question to be processed is determined based on each candidate question in the reference Q&A pair. The second target sentence vector corresponding to each candidate question in the reference Q&A pair is obtained. The first similarity between the question to be processed and each candidate question in the reference Q&A pair is determined based on the similarity between the first target sentence vector and the second target sentence vector corresponding to each candidate question in the reference Q&A pair. Thus, the first similarity between the question to be processed and each candidate question can be efficiently calculated based on the sentence vector corresponding to the question to be processed and the sentence vector corresponding to each candidate question.

In order to clearly illustrate how the first target sentence vector corresponding to the question to be processed is determined in any embodiment of the disclosure, the disclosure also provides a method for processing a question.

Figure 4:
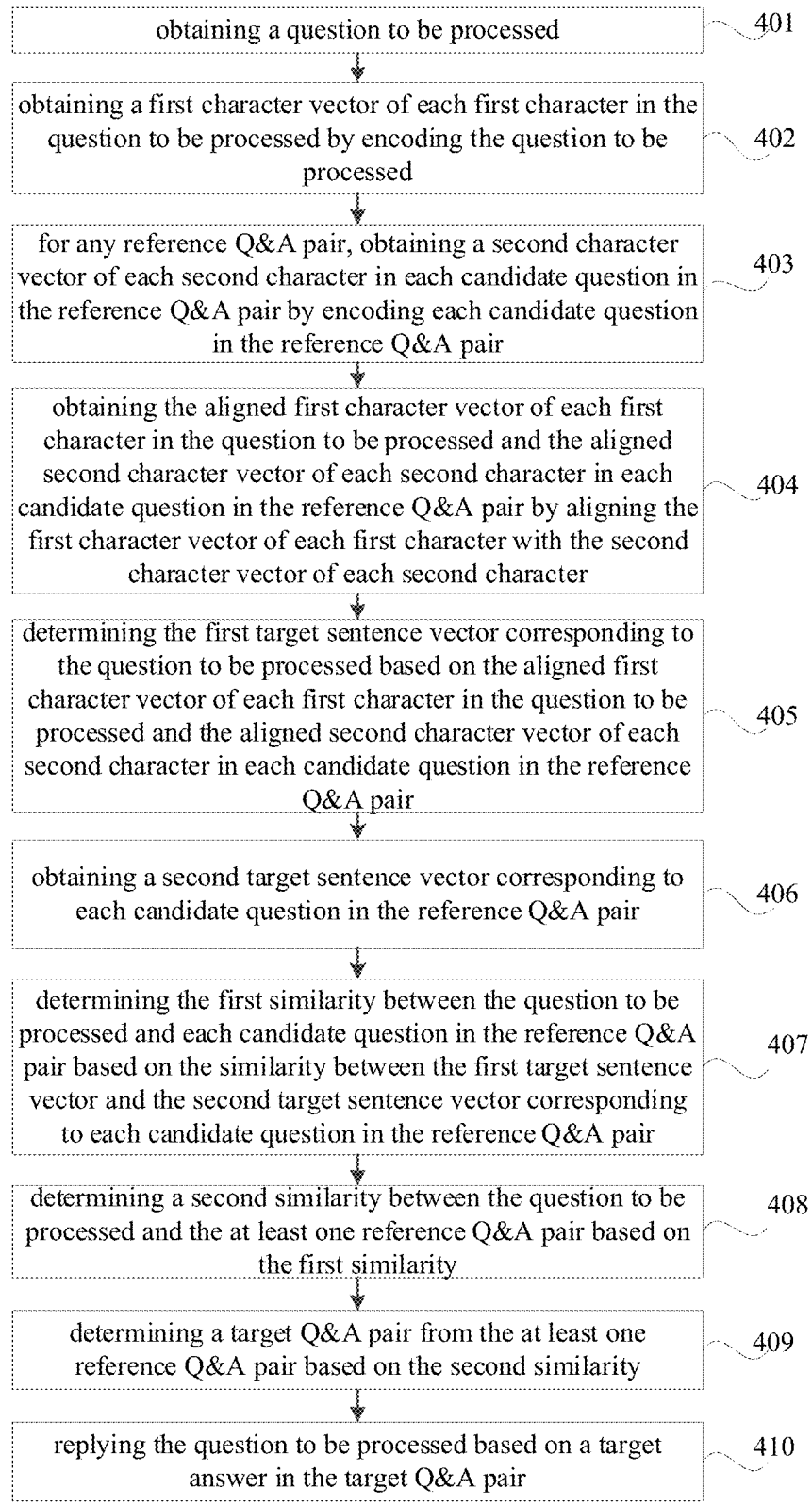
FIG. 4 is a flowchart of a method for processing a question according to the fourth embodiment of the disclosure.

FIG. 4 is a flowchart of a method for processing a question according to the fourth embodiment of the disclosure.

As illustrated in FIG. 4, the method for processing a question further includes the following steps at 401-410.

At 401, a question to be processed is obtained.

The execution process of 401 can be seen in the execution process of any of the embodiments of the disclosure and may not be described herein.

At 402, the question to be processed is encoded to obtain a first character vector of each first character in the question to be processed.

In the embodiments of the disclosure, each first character in the question to be processed may be encoded based on a text encoding method to obtain the first character vector corresponding to each first character in the question to be processed.

For example, encoders for natural language processing such as Long Short Term Memory (LSTM), Convolutional Neural Network (CNN), Bidirectional Encoder Representations from Transformers (BERT) are used to encode each first character in the question to be processed, to obtain the first character vector corresponding to each first character.

At 403, for any reference Q&A pair, each candidate question in the reference Q&A pair is encoded, to obtain a second character vector of each second character in each candidate question in the reference Q&A pair.

In the embodiment of the disclosure, for any reference Q&A pair, each second character in each candidate question in the reference Q&A pair can be encoded based on the text encoding method, to obtain the second character vector corresponding to each second character in the corresponding candidate question.

It should be noted that the lengths corresponding to different questions may be different, and in order to facilitate processing the questions of different lengths and to improve the accuracy and reliability of the subsequent target Q&A determination results, in a possible implementation of the disclosure, the questions to be processed and/or each candidate question may be aligned so that the lengths of the questions after the aligning match to each other. The length is the number of characters contained in the question.

In a possible implementation of the disclosure, the question to be processed may be aligned according to a preset length, in which the aligned length of the question to be processed is the preset length; and/or, each candidate question in the at least one reference Q&A pair may be aligned based on the preset length, and the aligned length of each candidate question matches the preset length.

For example, taking the preset length is 10 as an example, assuming that the question to be processed is "your name", which includes 8 characters, it is possible to pad "your name" to 10 characters, for example, as "your name PP", where P indicates the character for padding. Thereby, in this disclosure, each character in the question to be processed after padding can be encoded to obtain the first character vector corresponding to each character.

In another possible implementation, it is also possible to align the question to be processed with each candidate question in the at least one reference Q&A pair, so that the aligned length of the question to be processed matches the aligned length of each candidate question.

At 404, the aligned first character vector of each first character in the question to be processed and the aligned second character vector of each second character in each candidate question in the reference Q&A pair are obtained by aligning the first character vector of each first character with the second character vector of each second character.

In the embodiment of the disclosure, the first character vector corresponding to each first character in the question to be processed can be aligned with the second character vector corresponding to each second character in each candidate question in the above-mentioned reference Q&A pair, to obtain the aligned first character vector of each first character in the question to be processed, and the aligned second character vector of each second character in each candidate question in that reference Q&A pair.

For example, assuming that after the aligning of the question to be processed and each candidate question, the length of each question is n, i.e., each question contains n characters, and the first character vector corresponding to the $i^{th}$ first character in the question to be processed is labeled as $a_i$, where $0<i\le n$. For any candidate question, the second character vector corresponding to the $j^{th}$ second character in the candidate question is labeled as $b_j$, it is possible to firstly calculate the correlation between the $i^{th}$ first character in the question to be processed and the $j^{th}$ second character in the above candidate question, for example, the correlation between the $i^{th}$ first character $a_i$ and the $j^{th}$ second character $b_j$ can be determined by the following equation (3):

$$e_{ij}=F(a_i,b_j) \tag{3}$$

Where $e_{ij}$ is the correlation between $a_i$ and $b_j$, and F function is a nonlinear function used to map the vectors $a_i$ and $b_j$ to the real number space for similarity calculation.

The aligned first character vector of the $i^{th}$ first character in the question to be processed can be:

$$\alpha_i = \sum_{i=1}^{n} \frac{\exp(e_{ij})}{\sum_{k=1}^{n} \exp(e_{ij})} b_j \tag{4}$$

Where, $\alpha_i$ represents the $i^{th}$ first character after the aligning.

The aligned second character vector of the $j^{th}$ second character in the candidate question can be:

$$\beta_j = \sum_{i=1}^{n} \frac{\exp(e_{ij})}{\sum_{k=1}^{n} \exp(e_{ik})} b_j \tag{5}$$

Where, $\beta_j$ represents the $j^{th}$ second character after the aligning.

At 405, the first target sentence vector corresponding to the question to be processed is determined based on the aligned first character vector of each first character in the question to be processed and the aligned second character vector of each second character in each candidate question in the reference Q&A pair.

In the embodiments of the disclosure, the first target sentence vector corresponding to the question to be processed can be determined based on the aligned first character vector of each first character in the question to be processed and the aligned second character vector of each second character in each candidate question in the reference Q&A pair.

At 406, a second target sentence vector corresponding to each candidate question in the reference Q&A pair is obtained.

At 407, the first similarity between the question to be processed and each candidate question in the reference Q&A pair is determined based on the similarity between the first target sentence vector and the second target sentence vector corresponding to each candidate question in the reference Q&A pair.

At 408, a second similarity between the question to be processed and the at least one reference Q&A pair is determined based on the first similarity.

At 409, a target Q&A pair is determined from the at least one reference Q&A pair based on the second similarity.

At 410, the question to be processed is replied based on a target answer in the target question-answer pair.

The process of performing the steps at 406 to 410 can be found in the process of performing any of the embodiments of the disclosure and may not be repeated herein.

According to the method for processing a question of the disclosure, for any reference Q&A pair, the character vector of each character in the question to be processed is aligned with the character vector of each character in each candidate question in the reference Q&A pair, so that the sentence vector corresponding to the question to be processed is determined based on the aligned character vector of each character in the question to be processed and the aligned character vector of each character in each candidate question in the reference Q&A pair. Therefore, the sentence vector of the question to be processed is generated by combining the character vector of each character in each candidate question in the reference Q&A pair. That is, the sentence vector for the question to be processed is generated in combination with the relation between the question to be processed and each candidate question in the reference Q&A pair, which can improve the accuracy and reliability of the subsequent target Q&A pair determination results.

In order to clearly illustrate how the first target sentence vector corresponding to the question to be processed is determined in the above embodiments of the disclosure, the disclosure also provides a method for processing a question.

Figure 5:
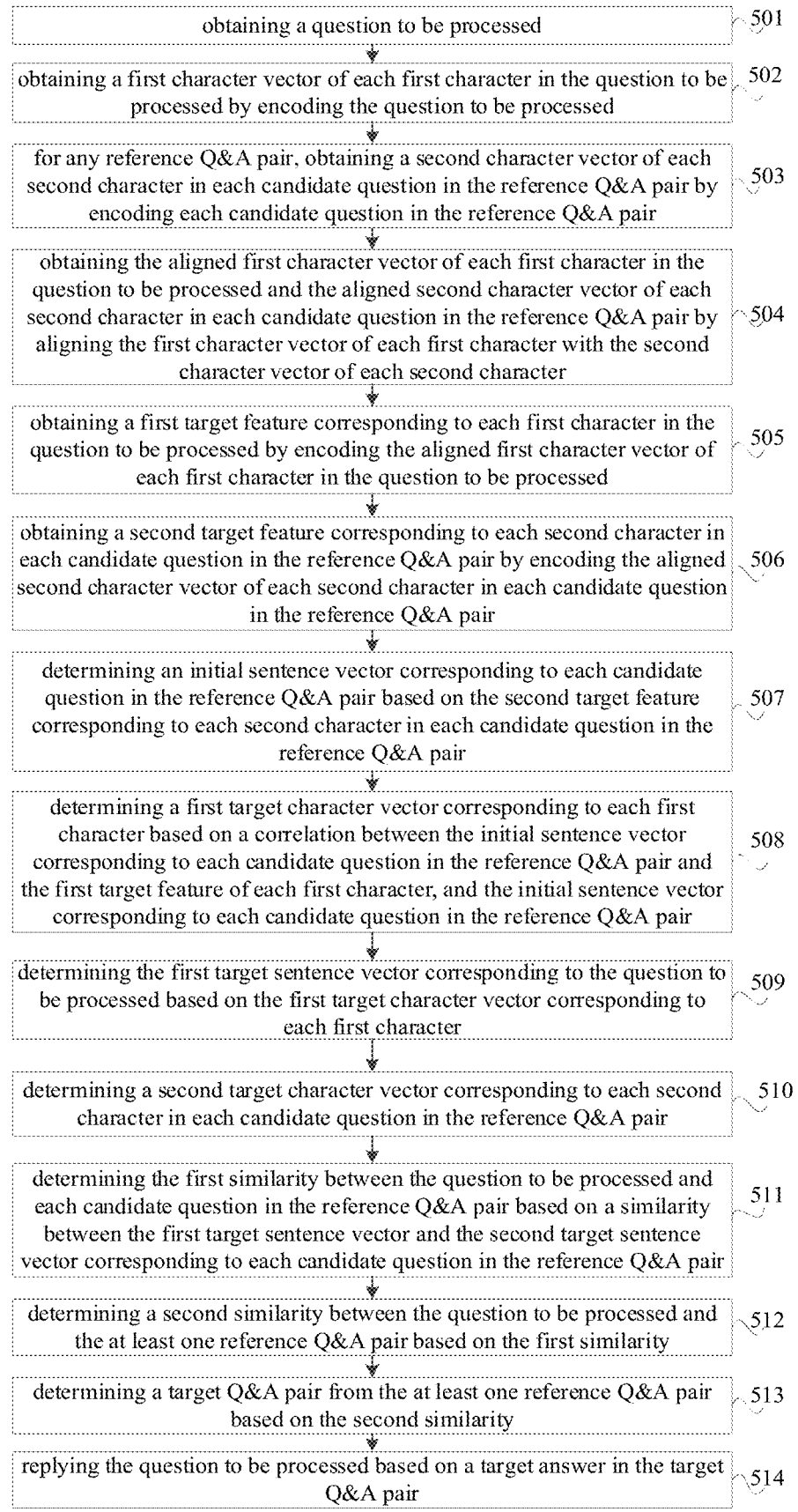
FIG. 5 is a flowchart of a method for processing a question according to the fifth embodiment of the disclosure.

FIG. 5 is a flowchart of a method for processing a question according to the fifth embodiment of the disclosure.

As illustrated in FIG. 5, the method for processing a question includes the following steps at 501-514.

At 501, a question to be processed is obtained.

At 502, the question to be processed is encoded to obtain a first character vector of each first character in the question to be processed.

At 503, for any reference Q&A pair, each candidate question in the reference Q&A pair is encoded, to obtain a second character vector of each second character in each candidate question in the reference Q&A pair.

At 504, the aligned first character vector of each first character in the question to be processed and the aligned second character vector of each second character in each candidate question in the reference Q&A pair are obtained by aligning the first character vector of each first character with the second character vector of each second character.

The execution process of the steps at 501 to 504 can be seen in the execution process of any of the above embodiments and may not be described herein.

At 505, a first target feature corresponding to each first character in the question to be processed is obtained by encoding the aligned first character vector of each first character in the question to be processed.

In the embodiments of the disclosure, the aligned first character vector of each first character in the question to be processed can be encoded again based on the text encoding method to obtain the first target feature corresponding to each first character in the question to be processed.

For example, the aligned first character vector of each first character in the question to be processed can be encoded again based on common encoders for natural language processing such as LSTM, CNN, and BERT, to obtain the first target feature corresponding to each first character.

At 506, a second target feature corresponding to each second character in each candidate question in the reference Q&A pair is obtained by encoding the aligned second character vector of each second character in each candidate question in the reference Q&A pair.

In the embodiment of the disclosure, for each candidate question in the reference Q&A pair, the aligned second character vector of each second character in the candidate question can also be encoded again based on the text encoding method to obtain the second target feature corresponding to each second character in the candidate question.

At 507, an initial sentence vector corresponding to each candidate question in the reference Q&A pair is determined based on the second target feature corresponding to each second character in each candidate question in the reference Q&A pair.

In the embodiments of the disclosure, the initial sentence vector corresponding to each candidate question in the reference Q&A pair may be determined based on the second target feature corresponding to each second character in each candidate question in the reference Q&A pair.

For example, the initial sentence vector corresponding to the candidate question can be determined by the following equation:

$$\beta^s = \sum_{j=0}^{n} \beta_j^s \tag{6}$$

where $\beta_s$ is the initial sentence vector corresponding to the $s^{th}$ candidate question in the reference Q&A pair, and $\beta_j^s$ is the second target feature corresponding to the $j^{th}$ second character in the $s^{th}$ candidate question.

At 508, a first target character vector corresponding to each first character is determined based on a correlation between the initial sentence vector corresponding to each candidate question in the reference Q&A pair and the first target feature of each first character, and the initial sentence vector corresponding to each candidate question in the reference Q&A pair.

In the embodiments of the disclosure, the correlation between the initial sentence vector corresponding to each candidate question in the reference Q&A pair and the first target feature of each first character can be calculated.

For example, the correlation between the initial sentence vector and the first target feature can be determined according to the following equation:

$$\eta_{is} = F(\alpha'_i, \beta^s) \tag{7}$$

Where $\alpha'_i$ represents the first target feature corresponding to the $i^{th}$ first character in the question to be processed, and $\eta_{is}$ represents the correlation between the first target feature of the $i^{th}$ first character in the question to be processed and the $s^{th}$ candidate question in the reference Q&A pair.

In the embodiments of the disclosure, the first target character vector corresponding to each first character may be determined based on the correlation between the initial sentence vector corresponding to each candidate question in the reference Q&A pair and the first target feature of each first character, and the initial sentence vector corresponding to each candidate question in that reference Q&A pair.

For example, the first target character vector corresponding to each first character can be determined according to the following formula:

$$\gamma_i = \sum_{s=1}^{m} \frac{\exp(\eta_{is})}{\sum_{k=1}^{m} \exp(\eta_{ik})} \beta^s \tag{8}$$

where $\gamma_i$ represents the first target character vector corresponding to the $i^{th}$ first character in the question to be processed, and m is the number of candidate questions in the reference Q&A pair.

At 509, the first target sentence vector corresponding to the question to be processed is determined based on the first target character vector corresponding to each first character.

In the embodiments of the disclosure, the first target sentence vector corresponding to the question to be processed may be determined based on the first target character vector corresponding to each first character in the question to be processed.

For example, the first target sentence vector is labeled as $\gamma$, which is determined by the following equation:

$$\gamma = \sum_{i=1}^{n} \gamma_i \quad (9)$$

where n is the number of first characters.

At 510, a second target sentence vector corresponding to each candidate question in the reference Q&A pair is obtained.

At 511, the first similarity between the question to be processed and each candidate question in the reference Q&A pair is determined based on the similarity between the first target sentence vector and the second target sentence vector corresponding to each candidate question in the reference Q&A pair.

At 512, a second similarity between the question to be processed and the at least one reference Q&A pair is determined based on the first similarity.

At 513, a target Q&A pair is determined from the at least one reference Q&A pair based on the second similarity.

At 514, the question to be processed is replied based on a target answer in the target Q&A pair.

The process of performing the steps at 510 to 514 can be found in the process of performing any of the embodiments of the disclosure and may not be repeated herein.

According to the method of the disclosure, the first target character vector corresponding to each first character in the question to be processed is calculated, so that the first target sentence vector corresponding to the question to be processed can be efficiently calculated based on the first target character vector.

To clearly illustrate how the second target sentence vector corresponding to each candidate question is determined in any embodiment of the disclosure, the disclosure also provides a method for processing a question.

Figure 6:
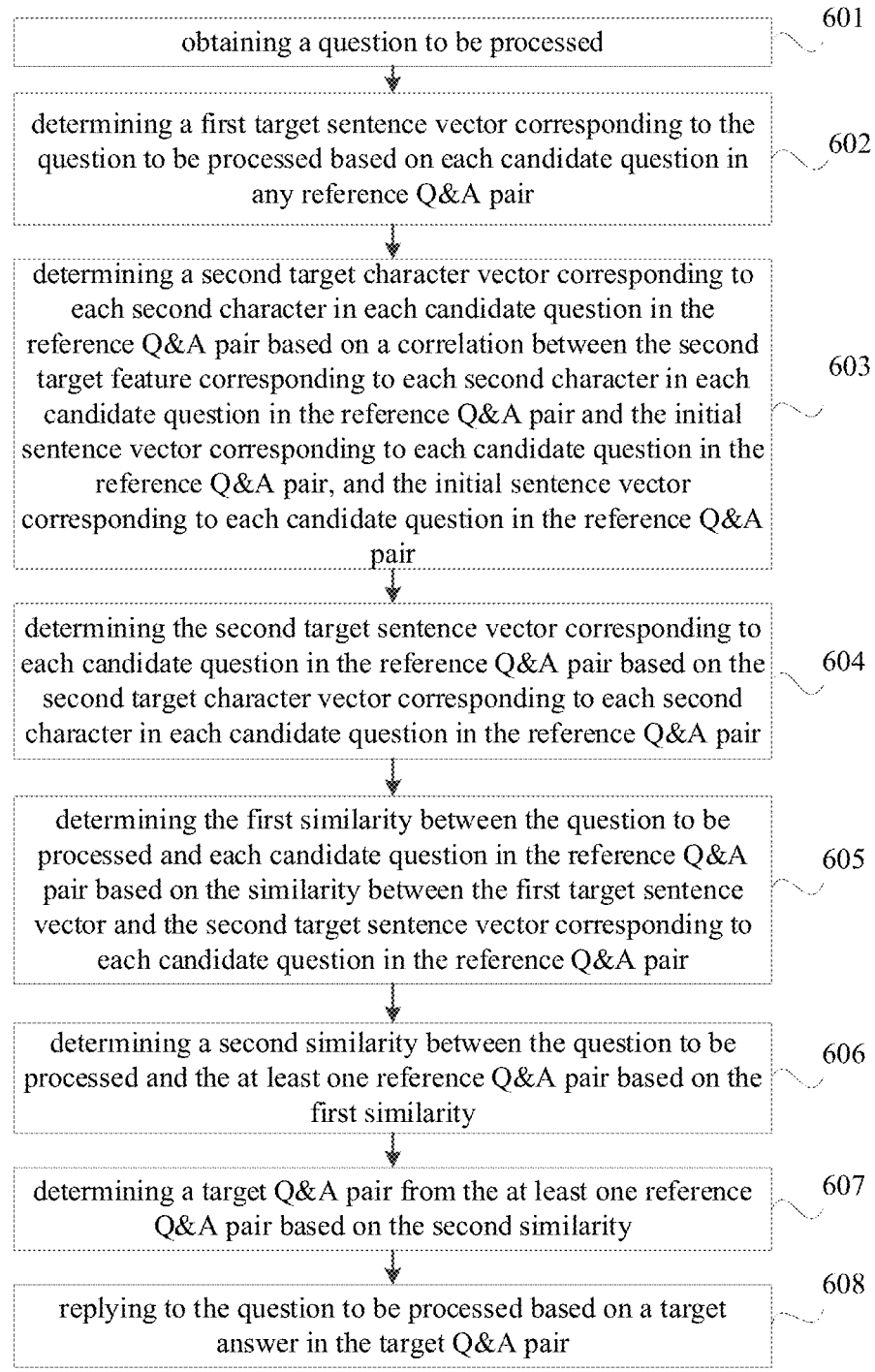
FIG. 6 is a flowchart of a method for processing a question according to the sixth embodiment of the disclosure.

FIG. 6 is a flowchart of a method for processing a question according to the sixth embodiment of the disclosure.

As illustrated in FIG. 6, the method for processing a question includes the following steps at 601-608.

At 601, a question to be processed is obtained.

At 602, for any reference Q&A pair, a first target sentence vector corresponding to the question to be processed is determined based on each candidate question in the reference Q&A pair.

The execution of the steps at 601 to 602 can be found in the execution of any of the embodiments of the disclosure and may not be repeated herein.

At 603, a second target character vector corresponding to each second character in each candidate question in the reference Q&A pair is determined based on a correlation between the second target feature corresponding to each second character in each candidate question in the reference Q&A pair and the initial sentence vector corresponding to each candidate question in the reference Q&A pair, and the initial sentence vector corresponding to each candidate question in the reference Q&A pair.

In the embodiments of the disclosure, the second target feature corresponding to each second character in each candidate question can be determined, and the initial sentence vector corresponding to each candidate question can be determined, based on the above embodiments.

In the embodiments of the disclosure, the correlation between the second target feature corresponding to each second character in each candidate question in the reference Q&A pair and the initial sentence vector corresponding to each candidate question in the reference Q&A pair can be calculated.

For example, the correlation between the second target feature and the initial sentence vector can be determined according to the following equation:

$$\eta_{js}=F(\beta'_j,\beta^s) \quad (10)$$

where $\beta'_j$ represents the second target feature corresponding to the $j^{th}$ second character of any candidate question in the reference Q&A pair, $\beta^s$ represents the initial sentence vector corresponding to the $s^{th}$ candidate question in the reference Q&A pair, and $\eta_{js}$ represents the correlation between the second target feature corresponding to the $j^{th}$ second character of any candidate question in the reference Q&A pair and the initial sentence vector corresponding to the $s^{th}$ candidate question in the reference Q&A pair.

In the embodiments of the disclosure, the second target character vector corresponding to each second character in each candidate question in the reference Q&A pair can be determined based on the correlation between the second target feature corresponding to each second character in each candidate question in the reference Q&A pair and the initial sentence vector corresponding to each candidate question in the reference Q&A pair, and the initial sentence vector corresponding to each candidate question in the reference Q&A pair.

For example, the second target character vector corresponding to each second character can be determined according to the following equation:

$$\delta_j = \sum_{s=1}^{m} \frac{\exp(\eta_{js})}{\sum_{k=1}^{m} \exp(\eta_{jk})} \beta^s \quad (11)$$

where $\delta_j$ represents the second target character vector corresponding to the $j^{th}$ second character in the candidate question in the equation (10) where $\beta'_j$ is located, and m is the number of candidate questions in the reference Q&A pair.

At 604, the second target sentence vector corresponding to each candidate question in the reference Q&A pair is determined based on the second target character vector corresponding to each second character in each candidate question in the reference Q&A pair.

In the embodiments of the disclosure, for each candidate question in the reference Q&A pair, the second target sentence vector corresponding to the candidate question may be determined based on the second target character vector corresponding to each second character in that candidate question.

For example, the second target sentence vector corresponding to each candidate question can be determined by the following equation:

$$\delta^s = \sum_{j=0}^{n} \delta_j^s \quad (12)$$

where $\delta_j^s$ represents the second target character vector corresponding to the $j^{th}$ second character in the $s^{th}$ candidate question in the reference Q&A pair, and $\delta^s$ represents the second target sentence vector corresponding to the $s^{th}$ reference question in the reference Q&A pair.

At 605, the first similarity between the question to be processed and each candidate question in the reference Q&A pair is determined based on the similarity between the first target sentence vector and the second target sentence vector corresponding to each candidate question in the reference Q&A pair.

At 606, a second similarity between the question to be processed and the at least one reference Q&A pair is determined based on the first similarity.

At 607, a target Q&A pair is determined from the at least one reference Q&A pair based on the second similarity At 608, the question to be processed is replied based on a target answer in the target Q&A pair.

The execution of the steps at 605 to 608 can be found in the execution of any of the embodiments of the disclosure and may not be repeated herein.

Taking the process of determining the similarity between the question to be processed and each reference Q&A pair by the FAQ matching model as an example, in the prediction phase of the FAQ matching model, the question to be processed and each reference question in each reference Q&A pair can be input to the FAQ matching model, so that the FAQ matching model outputs the second similarity between the question to be processed and each reference Q&A pair, the target Q&A pair can be determined from the reference Q&A pairs based on the second similarity of each reference Q&A pair, and thus the question to be processed can be replied based on the target answer in the target Q&A pair.

In the Training Phase of the FAQ Matching Model:
1. Training Sample Collection

The training data for the FAQ system matching algorithm is from the candidate questions in the database. However, when generating the training set, the same retrieval algorithm of the FAQ system can be used in order to make the FAQ matching model as close as possible to the inputs of the FAQ system. For the questions (subsequently called questions to be retrieved or questions to be processed) in the database, the algorithm of the existing FAQ system can be used for retrieving, so as to determine the candidate set (which includes multiple candidate questions, each candidate set corresponds to a reference Q&A pair, and the reference Q&A pair can include answers in addition to the candidate set), and then use {questions to be retrieved, retrieved candidate set, the category to which the retrieved candidate set belongs} to generate the training samples.

Figure 7:
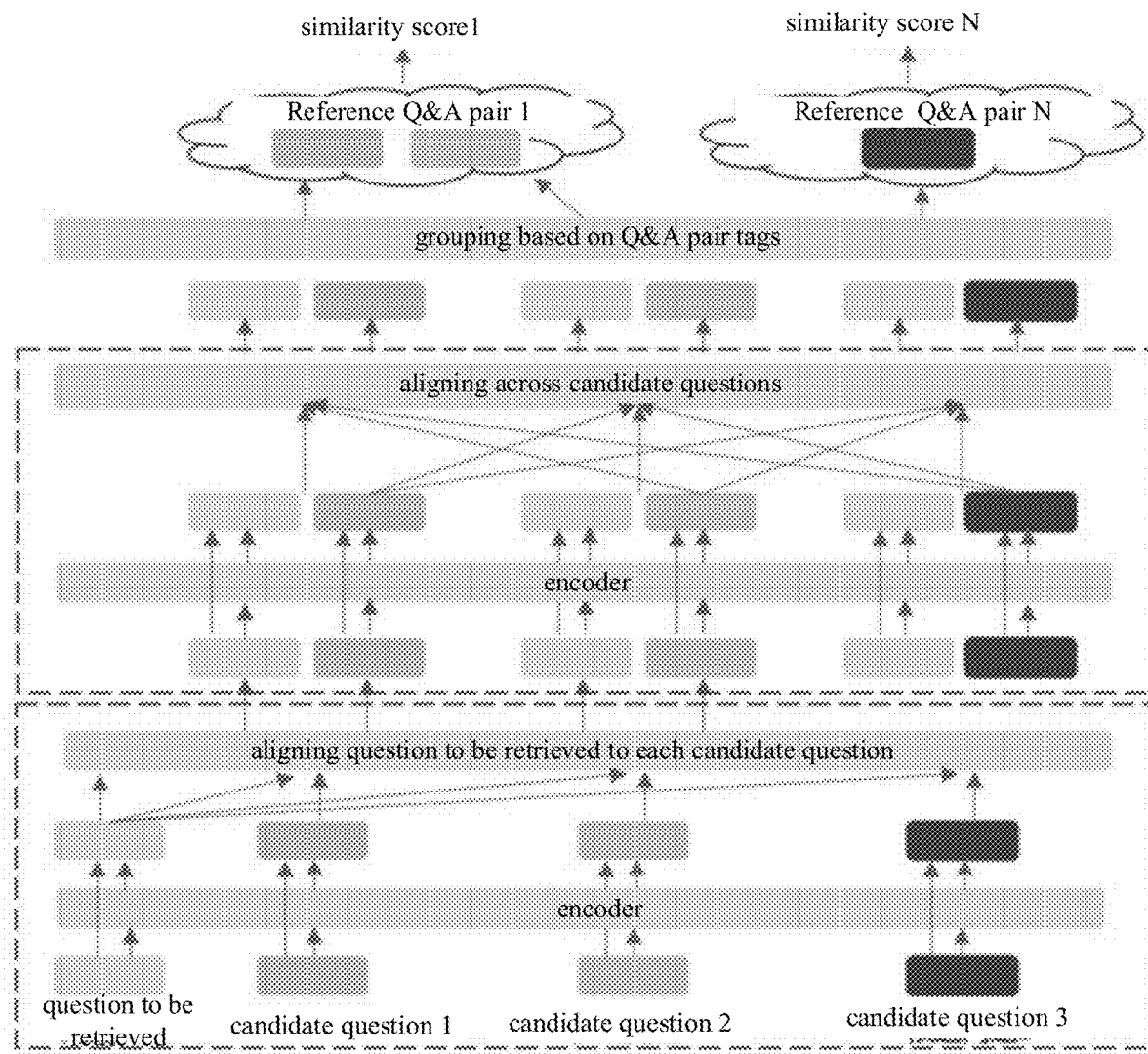
FIG. 7 is a structural schematic diagram of a model according to an embodiment of the disclosure.

2. The Model Structure can be as Shown in FIG. 7

The model structure is divided into three main layers, i.e., alignment of questions and candidate questions, alignment of cross-candidate questions, and score prediction of reference Q&A pair.

At first, the questions to be retrieved are aligned with the candidate questions.

Firstly, for any candidate question, the question to be retrieved and the candidate question can be encoded by the encoder, to obtain the character vector (or called an encoding vector) of each character in the question to be retrieved and the candidate question.

Secondly, the model needs that the inputs of each question has the same number of characters, but the number of characters contained in each question may be different. Therefore, in order to satisfy the input requirements of the model, each question (i.e., the question to be retrieved and the candidate question) can be padded until the question length reaches the specified length. For example, the question is padded to a length of 10 characters, if the question is "your name", "your name" can be changed into a 10-character question. i.e., "your name PP", where P is the character to be padded. Then, the character vector corresponding to the 10 characters of "your name PP" is calculated again.

Further, the character vector of each character in the question to be retrieved can be aligned with the encoding vector of each character in the candidate question, respectively.

(1) The character vector of the question to be retrieved is $a_i$ ($0<i\leq n$), where n is the number of characters of the question to be retrieved after the padding, i.e., $a_i$ is the character vector corresponding to the $i^{th}$ character in the question to be retrieved. The character vector of the candidate question is $b_j$ ($0<j\leq n$), where n is the number of characters of the candidate question after the padding, i.e., $b_j$ is the character vector corresponding to the $j^{th}$ character in the candidate question.

(2) The correlation $e_{ij}=F(a_i, b_j)$ between the $it^{th}$ character in the question to be retrieved and the $j^{th}$ character in the candidate question is calculated, then the aligned character vector of the $i^{th}$ character in the question to be retrieved is $$\alpha_i = \sum_{i=1}^{n} \frac{\exp(e_{ij})}{\sum_{k=1}^{n} \exp(e_{ik})} b_j \qquad (4)$$

The aligned character vector of the $j^{th}$ character in the candidate question is $$\beta_j = \sum_{i=1}^{n} \frac{\exp(e_{ij})}{\sum_{k=1}^{n} \exp(e_{ik})} b_j \qquad (5)$$

2. Alignment of Cross-Candidate Questions (1) The aligned character vector of each character in the question to be retrieved is input to the encoder for re-encoding to obtain the target feature corresponding to each character in the question to be retrieved, and the aligned character vector of each character in the candidate question is input to the encoder for re-encoding, to obtain the target feature corresponding to each character in the candidate question.

(2) Mutual Alignment Among the Candidate Questions.

Firstly, the initial sentence vector of each candidate question is calculated, that is, the initial sentence vector corresponding to the $s^{th}$ candidate question in the candidate set is:

$$\beta^s = \sum_{j=0}^{n} \beta_j^s,$$

where $\beta^s$ represents the initial sentence vector corresponding to the $s^{th}$ candidate question and $\beta_j^s$ represents the target feature corresponding to the $j^{th}$ character in the $s^{th}$ candidate question.

Secondly, the correlation $\eta_{is}=F(\alpha'_i, \beta^s)$ between the target feature of each character in the question to be retrieved and the initial sentence vector of the candidate question is calculated, in which, $\alpha'_i$ represents the target feature corresponding to the $i^{th}$ character in the question to be retrieved, $\eta_{is}$ represents the correlation between the target feature of the $i^{th}$ character in the question to be retrieved and the initial sentence vector corresponding to the $s^{th}$ candidate question in the candidate set. Moreover, the correlation $\eta_{js}=F(\beta'_j,\beta^s)$ between the target feature of each character in the candidate question and the initial sentence vector of the candidate question is calculated, in which, $\beta'_j$ represents the target feature of the $j^{th}$ character in any candidate question in the candidate set, $\beta^s$ represents the initial sentence vector of the $s^{th}$ candidate question in the candidate set, and $\eta_{js}$ represents the correlation between the target feature of the $j^{th}$ character in any candidate question in the candidate set and the initial sentence vector of the $s^{th}$ reference question in the candidate set.

The aligned target character vector corresponding to each character in the question to be retrieved is calculated by:

$$\gamma_i = \sum_{s=1}^{m} \frac{\exp(\eta_{is})}{\sum_{k=1}^{m} \exp(\eta_{ik})} \beta^s;$$

The aligned target character vector corresponding to each character in the candidate question is calculated by:

$$\delta_j = \sum_{s=1}^{m} \frac{\exp(\eta_{js})}{\sum_{k=1}^{m} \exp(\eta_{jk})} \beta^s;$$

where $\delta_j$ represents the target character vector corresponding to the $j^{th}$ character in the above candidate question where $\beta'_j$ is located.

3. the Score Prediction of Reference Q&A Pair.

Firstly, the target sentence vector corresponding to the question to be retrieved is calculated as $$\gamma = \sum_{i=1}^{n} \gamma_i,$$

and the target sentence vector corresponding to the candidate question is calculated as $$\delta^s = \sum_{j=0}^{n} \delta_j^s,$$

where $\delta_j^s$ represents the target character vector corresponding to the $j^{th}$ character of the $s^{th}$ candidate question in the candidate set, and $\delta^s$ represents the target sentence vector corresponding to the $s^{th}$ candidate question above.

Secondly, the similarity score $y_s = H(\gamma, \delta^s)$ (denoted as the first similarity in this disclosure) between the question to be retrieved and the candidate question is calculated, where $y_s$ is the similarity score (i.e., the first similarity) between the $s^{th}$ candidate question in the candidate set and the question to be retrieved.

In this disclosure, the score of the reference Q&A pair (i.e., the second similarity between the question to be retrieved and the reference Q&A pair) can be obtained by accumulating the similarity scores of each candidate question in the candidate set, so that the second similarity each reference Q&A pair can be:

$$y_c = sigmoid\left(\sum_{sth\ candidate question\ belongs\ to\ the\ cth\ Q\&A\ pair} \max(y_s, T)\right),$$

where $y_c$ is the second similarity of the $c^{th}$ reference Q&A pair and $y_s$ is the first similarity of the $s^{th}$ candidate question in the $c^{th}$ reference Q&A pair.

The sigmoid function is mapping the real number space to the interval of (0,1), which is used to represent a matching score of each reference Q&A pair. In this case, $\max(y_s,0)$ is used to remove the negative impact of candidate questions that have a negative impact on the reference Q&A pair.

The training samples collected at step 1 above can be input to the model for training, that is, the loss function can be generated based on the difference between a labeled similarity score between the question to be retrieved and the reference Q&A pair in the training samples and the similarity score between the question to be retrieved and the reference Q&A pair outputted by the model. According to the value of the loss function, the model is trained to minimize the value of the loss function, where the loss function for the training can be a Binary Cross Entropy (BCE) loss, and the trainer can be adam that is commonly used.

In the model prediction phase, the user input question to be processed and each candidate question in each reference Q&A pair are simply inputted into the model, and the score of each reference Q&A pair can be predicted, so that an answer in the reference Q&A pair with the greatest score can be used as an answer corresponding to the question to be processed.

Therefore, the FAQ candidate set is directly input into the model, which is more consistent with the objective of the FAQ system. Moreover, the model considers the correlation among the candidate questions, which can improve the accuracy of the model prediction results. While the inputs of the training phase are exactly the same as that of the prediction phase, the error between training and prediction can be reduced. In addition, the model matching is based on the similarity score of the reference Q&A pair instead of a similarity score of each candidate question, which is also more consistent with the objective of the FAQ system, thereby reducing the interference of abnormal candidate questions to the final recognition effects, and further improving the accuracy of the model prediction results.

According to the method of the embodiments of the disclosure, the second target character vector corresponding to each second character in each candidate question in the reference Q&A pair is calculated, so that the second target sentence vector corresponding to each candidate question can be efficiently calculated based on the second target character vector.

Corresponding to the method provided in the embodiments of FIGS. 1 to 6 above, the disclosure also provides an apparatus for processing a question. Since the apparatus provided in the embodiments of the disclosure corresponds to the method provided in the embodiments of FIGS. 1 to 6 above, the manner in which the method is implemented also applies to the apparatus provided in the embodiments of the disclosure, which may not be described in detail in the embodiments of the disclosure.

Figure 8:
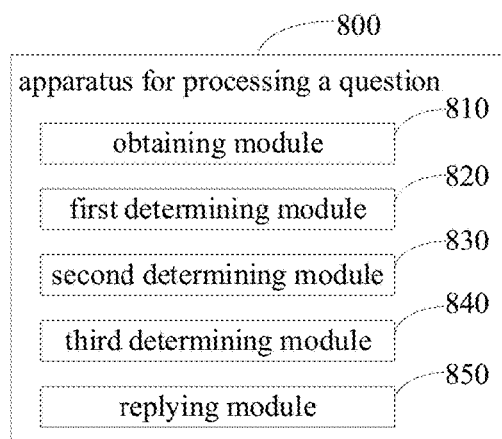
FIG. 8 is a structural schematic diagram of an apparatus for processing a question according to the seventh embodiment of the disclosure.

FIG. 8 is a structural schematic diagram of an apparatus for processing a question according to the seventh embodiment of the disclosure.

As illustrated in FIG. 8, the apparatus for processing a question 800 includes: an obtaining module 810, a first determining module 820, a second determining module 830, a third determining module 840 and a replying module 850.

The obtaining module 810 is configured to obtain a question to be processed.

The first determining module 820 is configured to determine a first similarity between the question to be processed and each candidate question in at least one reference Q&A pair.

The second determining module 830 is configured to determine a second similarity between the question to be processed and the at least one reference Q&A pair based on the first similarity.

The third determining module 840 is configured to determine a target Q&A pair from the at least one reference Q&A pair based on the second similarity.

The replying module 850 is configured to reply the question to be processed based on a target answer in the target Q&A pair.

In a possible implementation of the embodiments of the disclosure, the second determining module 830 is further configured to: determine target questions having a first similarity greater than a preset threshold value from the candidate questions in any reference Q&A pair; obtaining a similarity score by accumulating the first similarity of each of the target questions, or by weighting and adding the first similarity of each of the target questions; and determine, based on the similarity score, the second similarity between the question to be processed and the corresponding reference Q&A pair.

In a possible implementation of the embodiments of the disclosure, the first determining module 820 includes: a first determining unit, an obtaining unit and a second determining unit.

The first determining unit is configured to, for any reference Q&A pair, determine a first target sentence vector corresponding to the question to be processed based on each candidate question in the reference Q&A pair.

The obtaining unit is configured to obtain a second target sentence vector corresponding to each candidate question in the reference Q&A pair.

The second determining unit is configured to determine the first similarity between the question to be processed and each candidate question in the reference Q&A pair based on the similarity between the first target sentence vector and the second target sentence vector corresponding to each candidate question in the reference Q&A pair.

In a possible implementation of the embodiments of the disclosure, the first determining unit is further configured to: obtain a first character vector of each first character in the question to be processed by encoding the question to be processed; for any reference Q&A pair, obtain a second character vector of each second character in each candidate question in the reference Q&A pair by encoding each candidate question in the reference Q&A pair; obtain the aligned first character vector of each first character in the question to be processed and the aligned second character vector of each second character in each candidate question in the reference Q&A pair by aligning the first character vector of each first character with the second character vector of each second character; and determine the first target sentence vector corresponding to the question to be processed based on the aligned first character vector of each first character in the question to be processed and the aligned second character vector of each second character in each candidate question in the reference Q&A pair.

In a possible implementation of the embodiments of the disclosure, the first determining unit is further configured to: obtain a first target feature corresponding to each first character in the question to be processed by encoding the aligned first character vector of each first character in the question to be processed; obtain a second target feature corresponding to each second character in each candidate question in the reference Q&A pair by encoding the aligned second character vector of each second character in each candidate question in the reference Q&A pair; determine an initial sentence vector corresponding to each candidate question in the reference Q&A pair based on the second target feature corresponding to each second character in each candidate question in the reference Q&A pair; determine a first target character vector corresponding to each first character based on a correlation between the initial sentence vector corresponding to each candidate question in the reference Q&A pair and the first target feature of each first character, and the initial sentence vector corresponding to each candidate question in the reference Q&A pair; and determine the first target sentence vector corresponding to the question to be processed based on the first target character vector corresponding to each first character.

In a possible implementation of the embodiments of the disclosure, the obtaining unit is further configured to: determine a second target character vector corresponding to each second character in each candidate question in the reference Q&A pair based on a correlation between the second target feature corresponding to each second character in each candidate question in the reference Q&A pair and the initial sentence vector corresponding to each candidate question in the reference Q&A pair, and the initial sentence vector corresponding to each candidate question in the reference Q&A pair; and determine the second target sentence vector corresponding to each candidate question in the reference Q&A pair based on the second target character vector corresponding to each second character in each candidate question in the reference Q&A pair.

In a possible implementation of the embodiments of the disclosure, the first determining unit is further configured to: align the question to be processed based on a preset length, so that the aligned length of the question to be processed matches the preset length; and/or align each candidate question in the at least one reference Q&A pair based on a preset length, so that the aligned length of each candidate question matches the preset length; and/or align the question to be processed with each candidate question in the at least one reference Q&A pair, so that the aligned length of the question to be processed matches the length of each candidate question.

In a possible implementation of the embodiments of the disclosure, the third determining module 840 is further configured to: determine a reference Q&A pair having a second similarity greater than a similarity threshold value as the target Q&A pair; or, determine a reference Q&A pair having the maximum second similarity as the target Q&A pair.

With the apparatus for processing a question of the disclosure, the first similarity between the question to be processed and each candidate question in the at least one reference Q&A pair, and the second similarity between the question to be processed and the at least one reference Q&A pair are determined. Afterwards, the target Q&A pair is determined from the at least one reference Q&A pair based on the second similarity, to reply to the question to be processed based on the target answer in the target Q&A pair. Therefore, the target Q&A pair of the question to be processed is determined based on the similarity between the question to be processed and each reference Q&A pair, to reply to the question to be processed according to the target answer in the target Q&A pair, thereby improving the accuracy and reliability of the question reply results.

To implement the above embodiments, the disclosure further provides an electronic device. The electronic device includes at least one processor and a memory communicatively connected to the at least one processor. The memory stores instructions executable by the at least one processor, and when the instructions are executed by the at least one processor, the at least one processor is caused to implement the method for processing a question according to any of the above embodiments of the disclosure.

To implement the above embodiments, the disclosure further provides a non-transitory computer-readable storage medium having computer instructions stored thereon. The computer instructions are used to cause a computer to implement the method for processing a question according to any of the above embodiments of the disclosure.

To implement the above embodiments, the disclosure also provides a computer program product containing computer programs. When the computer programs are executed by a processor, the method for processing a question according to any of the above embodiments of the disclosure is implemented.

According to the embodiments of the disclosure, the disclosure also provides an electronic device, a readable storage medium and a computer program product.

Figure 9:
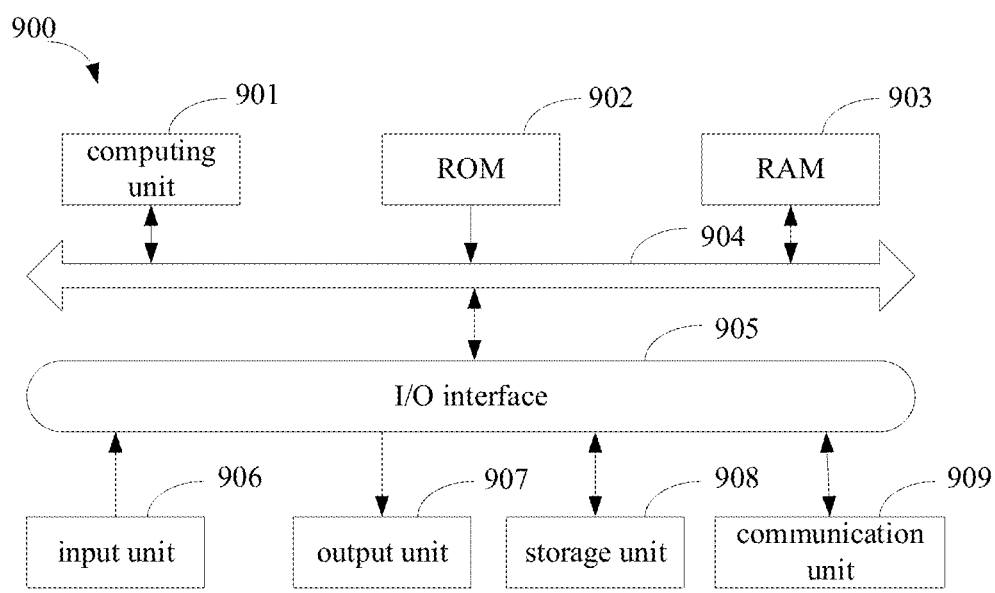
FIG. 9 is a schematic diagram of an example electronic device that can be used to implement the embodiment of the disclosure.

FIG. 9 is a block diagram of an example electronic device according to the embodiments of the disclosure. The electronic device may include the server side and client side in the above embodiments. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device 900 includes a computing unit 901 performing various appropriate actions and processes based on computer programs stored in a Read-Only Memory (ROM) 902 or computer programs loaded from the storage unit 908 to a Random Access Memory (RAM) 903. In the RAM 903, various programs and data required for the operation of the device 900 are stored. The computing unit 901, the ROM 902, and the RAM 903 are connected to each other through a bus 904. An Input/Output (I/O) interface 905 is also connected to the bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, and wireless communication transceivers. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 901 executes the various methods and processes described above, such as the method for processing a question. For example, in some embodiments, the method for processing a question may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the method described above may be executed. Alternatively, in other embodiments, the computing unit 901 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, RAM, ROM, electrically programmable read-only-memory (EPROM), flash memory, fiber optics, Compact Disc Read-Only Memory (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the defects of difficult management and weak business scalability in the traditional physical host and Virtual Private Server (VPS) service. The server can also be a server of distributed system or a server combined with block-chain.

It is noted that AI is a subject that studies the use of computers to simulate certain human thinking processes and intelligent behaviors (such as learning, reasoning, thinking and planning), which involves both the hardware-level technology and the software-level technology. AI hardware technology generally includes technologies such as sensor, special AI chip, cloud computing, distributed storage and big data processing. AI software technology mainly includes computer vision, speech recognition technology, natural language processing technology and machine learning/deep learning, big data processing technology and knowledge map technology.

According to the technical solution of the disclosure, the first similarity between the question to be processed and each candidate question in the at least one reference question-answer pair, and the second similarity between the question to be processed and the at least one reference question-answer pair are determined. Afterwards, the target question-answer pair is determined from the at least one reference question-answer pair based on the second similarity, to reply to the question to be processed based on the target answer in the target question-answer pair. Therefore, the target question-answer pair of the question to be processed is determined based on the similarity between the question to be processed and each reference question-answer pair, to reply to the question to be processed according to the target answer in the target question-answer pair, thereby improving the accuracy and reliability of the question reply results.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for processing a question, performed by an electronic device, comprising:
    receiving a question to be processed from a user input;
    determining a first similarity between the question to be processed and each candidate question in at least one reference question-answer (Q&A) pair;
    determining a second similarity between the question to be processed and the at least one reference Q&A pair based on the first similarity;
    determining a target Q&A pair from the at least one reference Q&A pair based on the second similarity; and
    replying to the user for the question to be processed based on a target answer in the target Q&A pair;
    wherein determining the second similarity between the question to be processed and the at least one reference Q&A pair comprises:
    determining target questions having a first similarity greater than a preset threshold value from the candidate questions in any reference Q&A pair;
    obtaining a similarity score by accumulating the first similarities of the target questions, or determining a weighted sum of the first similarities of the target questions as the similarity score; and
    determining, based on the similarity score, the second similarity between the question to be processed and the corresponding reference Q&A pair.

2. The method of claim 1, wherein determining the first similarity between the question to be processed and each candidate question in the at least one reference Q&A pair, comprises:
    determining, for any reference Q&A pair, a first target sentence vector for the question to be processed based on each candidate question in the reference Q&A pair;
    obtaining a second target sentence vector for each candidate question in the reference Q&A pair; and
    determining the first similarity between the question to be processed and each candidate question in the reference Q&A pair based on a similarity between the first target sentence vector and the second target sentence vector for each candidate question in the reference Q&A pair.

3. The method of claim 2, wherein determining, for any reference Q&A pair, the first target sentence vector for the question to be processed based on each candidate question in the reference Q&A pair, comprises:
    obtaining a first character vector of each first character in the question to be processed by encoding the question to be processed;

for any reference Q&A pair, obtaining a second character vector of each second character in each candidate question in the reference Q&A pair by encoding each candidate question in the reference Q&A pair;

obtaining the aligned first character vector of each first character in the question to be processed and the aligned second character vector of each second character in each candidate question in the reference Q&A pair, by aligning the first character vector of each first character with the second character vector of each second character; and determining the first target sentence vector for the question to be processed based on the aligned first character vector of each first character in the question to be processed and the aligned second character vector of each second character in each candidate question in the reference Q&A pair.

4. The method of claim 3, wherein determining the first target sentence vector for the question to be processed based on the aligned first character vector of each first character in the question to be processed and the aligned second character vector of each second character in each candidate question in the reference Q&A pair, comprises:

obtaining a first target feature for each first character in the question to be processed by encoding the aligned first character vector of each first character in the question to be processed;

obtaining a second target feature for each second character in each candidate question in the reference Q&A pair by encoding the aligned second character vector of each second character in each candidate question in the reference Q&A pair;

determining an initial sentence vector for each candidate question in the reference Q&A pair based on the second target feature for each second character in each candidate question in the reference Q&A pair;

determining a first target character vector for each first character based on a correlation between the initial sentence vector for each candidate question in the reference Q&A pair and the first target feature of each first character, and the initial sentence vector for each candidate question in the reference Q&A pair; and determining the first target sentence vector for the question to be processed based on the first target character vector for each first character.

5. The method of claim 4, wherein obtaining the second target sentence vector for each candidate question in the reference Q&A pair, comprises:

determining a second target character vector for each second character in each candidate question in the reference Q&A pair based on a correlation between the second target feature for each second character in each candidate question in the reference Q&A pair and the initial sentence vector for each candidate question in the reference Q&A pair, and the initial sentence vector for each candidate question in the reference Q&A pair; and determining the second target sentence vector for each candidate question in the reference Q&A pair based on the second target character vector for each second character in each candidate question in the reference Q&A pair.

6. The method of claim 3, wherein before encoding the question to be processed, the method further comprises at least one of:

aligning the question to be processed based on a preset length, so that the aligned length of the question to be processed is equal to the preset length;

aligning each candidate question in the at least one reference Q&A pair based on a preset length, so that the aligned length of each candidate question is equal to the preset length;

aligning the question to be processed with each candidate question in the at least one reference Q&A pair, so that the aligned length of the question to be processed is equal to the aligned length of each candidate question.

7. The method of claim 1, wherein determining the target Q&A pair from the at least one reference Q&A pair based on the second similarity comprises:

determining a reference Q&A pair having a second similarity greater than a similarity threshold value as the target Q&A pair; or determining a reference Q&A pair having the maximum second similarity as the target Q&A pair.

8. An electronic device, comprising:

at least one processor; and a memory configured to store instructions executable by the at least one processor, wherein when the instructions are executed by the at least one processor, the at least one processor is caused to:

receive a question to be processed from a user input;

determine a first similarity between the question to be processed and each candidate question in at least one reference question-answer (Q&A) pair;

determine a second similarity between the question to be processed and the at least one reference Q&A pair based on the first similarity;

determine a target Q&A pair from the at least one reference Q&A pair based on the second similarity; and reply to the user for the question to be processed based on a target answer in the target Q&A pair;

wherein the at least one processor is further caused to:

determine target questions having a first similarity greater than a preset threshold value from the candidate questions in any reference Q&A pair;

obtain a similarity score by accumulating the first similarities of the target questions, or determining a weighted sum of the first similarities of the target questions as the similarity score; and determine, based on the similarity score, the second similarity between the question to be processed and the corresponding reference Q&A pair.

9. The electronic device of claim 8, wherein the at least one processor is further caused to:

determine, for any reference Q&A pair, a first target sentence vector for the question to be processed based on each candidate question in the reference Q&A pair;

obtain a second target sentence vector for each candidate question in the reference Q&A pair; and determine the first similarity between the question to be processed and each candidate question in the reference Q&A pair based on a similarity between the first target sentence vector and the second target sentence vector for each candidate question in the reference Q&A pair.

10. The electronic device of claim 9, wherein the at least one processor is further caused to:

obtain a first character vector of each first character in the question to be processed by encoding the question to be processed;

for any reference Q&A pair, obtaining a second character vector of each second character in each candidate question in the reference Q&A pair by encoding each candidate question in the reference Q&A pair;
obtain the aligned first character vector of each first character in the question to be processed and the aligned second character vector of each second character in each candidate question in the reference Q&A pair, by aligning the first character vector of each first character with the second character vector of each second character; and
determine the first target sentence vector for the question to be processed based on the aligned first character vector of each first character in the question to be processed and the aligned second character vector of each second character in each candidate question in the reference Q&A pair.

11. The electronic device of claim 10, wherein the at least one processor is further caused to:
obtain a first target feature for each first character in the question to be processed by encoding the aligned first character vector of each first character in the question to be processed;
obtain a second target feature for each second character in each candidate question in the reference Q&A pair by encoding the aligned second character vector of each second character in each candidate question in the reference Q&A pair;
determine an initial sentence vector for each candidate question in the reference Q&A pair based on the second target feature for each second character in each candidate question in the reference Q&A pair;
determine a first target character vector for each first character based on a correlation between the initial sentence vector for each candidate question in the reference Q&A pair and the first target feature of each first character, and the initial sentence vector for each candidate question in the reference Q&A pair; and
determine the first target sentence vector for the question to be processed based on the first target character vector for each first character.

12. The electronic device of claim 11, wherein the at least one processor is further caused to:
determine a second target character vector for each second character in each candidate question in the reference Q&A pair based on a correlation between the second target feature for each second character in each candidate question in the reference Q&A pair and the initial sentence vector for each candidate question in the reference Q&A pair, and the initial sentence vector for each candidate question in the reference Q&A pair; and
determine the second target sentence vector for each candidate question in the reference Q&A pair based on the second target character vector for each second character in each candidate question in the reference Q&A pair.

13. The electronic device of claim 10, wherein before encoding the question to be processed, the method further comprises at least one of:
align the question to be processed based on a preset length, so that the aligned length of the question to be processed is equal to the preset length;
align each candidate question in the at least one reference Q&A pair based on a preset length, so that the aligned length of each candidate question is equal to the preset length;
align the question to be processed with each candidate question in the at least one reference Q&A pair, so that the aligned length of the question to be processed is equal to the aligned length of each candidate question.

14. The electronic device of claim 8, wherein the at least one processor is further caused to:
determine a reference Q&A pair having a second similarity greater than a similarity threshold value as the target Q&A pair; or
determine a reference Q&A pair having the maximum second similarity as the target Q&A pair.

15. A non-transitory computer-readable storage medium having computer instructions stored thereon, wherein the computer instructions are configured to cause a computer to implement a method for processing a question, the method comprising:
receiving a question to be processed from a user input;
determining a first similarity between the question to be processed and each candidate question in at least one reference question-answer (Q&A) pair;
determining a second similarity between the question to be processed and the at least one reference Q&A pair based on the first similarity;
determining a target Q&A pair from the at least one reference Q&A pair based on the second similarity; and
replying to the user for the question to be processed based on a target answer in the target Q&A pair;
wherein determining the second similarity between the question to be processed and the at least one reference Q&A pair comprises:
determining target questions having a first similarity greater than a preset threshold value from the candidate questions in any reference Q&A pair;
obtaining a similarity score by accumulating the first similarities of the target questions, or determining a weighted sum of the first similarities of the target questions as the similarity score; and
determining, based on the similarity score, the second similarity between the question to be processed and the corresponding reference Q&A pair.

16. The storage medium of claim 15, wherein determining the first similarity between the question to be processed and each candidate question in the at least one reference Q&A pair, comprises:
determining, for any reference Q&A pair, a first target sentence vector for the question to be processed based on each candidate question in the reference Q&A pair;
obtaining a second target sentence vector for each candidate question in the reference Q&A pair; and
determining the first similarity between the question to be processed and each candidate question in the reference Q&A pair based on a similarity between the first target sentence vector and the second target sentence vector for each candidate question in the reference Q&A pair.

17. The storage medium of claim 16, wherein determining, for any reference Q&A pair, the first target sentence vector for the question to be processed based on each candidate question in the reference Q&A pair, comprises:
obtaining a first character vector of each first character in the question to be processed by encoding the question to be processed;
for any reference Q&A pair, obtaining a second character vector of each second character in each candidate question in the reference Q&A pair by encoding each candidate question in the reference Q&A pair;
obtaining the aligned first character vector of each first character in the question to be processed and the aligned second character vector of each second character in each candidate question in the reference Q&A pair, by aligning the first character vector of each first character with the second character vector of each second character; and determining the first target sentence vector for the question to be processed based on the aligned first character vector of each first character in the question to be processed and the aligned second character vector of each second character in each candidate question in the reference Q&A pair.

* * * * *